INVENTOR.
PAUL MARCUS

Aug. 18, 1970          P. MARCUS          3,524,224
                    CORE PIN ACTIVATOR
Filed Nov. 14, 1967                      2 Sheets-Sheet 2

INVENTOR.
PAUL MARCUS
BY
Brumbaugh, Free, Graves & Donohue
his ATTORNEYS

United States Patent Office 3,524,224
Patented Aug. 18, 1970

3,524,224
CORE PIN ACTIVATOR
Paul Marcus, Pearl River, N.Y., assignor to APL Corporation, Brooklyn, N.Y., a corporation of New York
Filed Nov. 14, 1967, Ser. No. 682,877
Int. Cl. B29f *1/022;* B29c *1/16*
U.S. Cl. 18—30                                                       3 Claims

ABSTRACT OF THE DISCLOSURE

Injection molding apparatus for facilitating manufacture of a plastic container having a rim defining an opening thereinto is provided with a core pin co-operating with outer mold means to form an injection mold cavity. The core pin is formed with a rim-defining portion and a first annular mating surface, and the outer mold means is formed with a second annular mating surface. The two surfaces are complemental and parallel to each other. Motive means is provided for bringing the surfaces together in a direction perpendicular to the surfaces to preclude sliding of the surfaces across each other. The surfaces when engaged are spaced apart from the extremity of the rim defining portion to preclude flashing of mold substance at the extremity of the rim. The motive means includes a piston-cylinder assembly and a rocker arm for advancing the core pin to its operative position for the injection of mold substance and biasing means for returning the rocker arm and core pin to their starting or retracted positions.

BACKGROUND OF THE INVENTION

This invention relates to injection molding apparatus and, more particularly, to novel and highly-effective injection molding apparatus having a long useful life and facilitating the manufacture of plastic containers formed with rims that are free of flashing in the vicinity of the extremity of the rims.

A difficulty experienced in present injection molding operations is the formation of a flashing at the rim of the molded article where the core pin and outer mold means meet. Typically, the surface of the core pin and the surface of the outer mold means that meet to seal the injection mold cavity are parallel to the axis of the mold core and slide across one another in forming the seal. This soon results in wear of the surfaces and permits flashing of the mold substance, which is injected into the mold cavity under high pressure. This flashing is at an undesirable location, being at the extremity of the rim, and detracts from the appearance of the finished article and interferes with its function, as by making it difficult to screw a cap onto the finished article.

Various attempts have been made heretofore to solve the problem of wear and flashing but the expidents adopted prior to the present invention have been unsatisfactory. In particular, such expedients have included mating surfaces sliding over each other with resulting wear and eventual flashing.

SUMMARY OF THE INVENTION

An object of this invention is to remedy the shortcomings of conventional apparatus noted above. In particular, an object of the invention is to provide molding apparatus for facilitating manufacture of a plastic container having a rim defining an opening thereinto, the apparatus being so constructed as to preclude all possibility of flashing at the extremity of the rim and substantially eliminate the possibility of flashing elsewhere. Another object of the invention is to provide molding apparatus having a significantly longer useful life than conventional apparatus. A further object of the invention is to provide a novel combination of a core pin, outer mold means, and motive means for moving the core pin and outer mold means with respect to each other to facilitate the economical manufacture of plastic articles of high quality.

The foregoing and other objects of the invention are attained in molding apparatus for facilitating manufacture of a plastic container having a rim defining an opening thereinto by the provision of inner and outer mold means co-operating to form an injection mold cavity, the inner mold means being formed with a rim-defining portion and a first annular mating surface and the outer mold means being formed with a second annular mating surface. The surfaces are complemental and parallel to each other. Motive means is provided for effecting relative movement of the inner and outer mold means with respect to each other to bring the surfaces into engaging relation, the relative movement being at an angle to the surfaces to preclude sliding of the surfaces across each other during the relative movement. The surfaces when engaged are spaced apart from the extremity of the rim-defining portion to preclude flashing of mold substance at the extremity of the rim.

BRIEF DESCRIPTION OF THE DRAWING

An understanding of additional aspects of the invention may be gained from a consideration of the following detailed description of a representative embodiment thereof taken in conjunction with the accompanying figures of the drawing, in which.

DESCRIPTION OF THE PREFERRED EMBODIMENT

Figure 1:
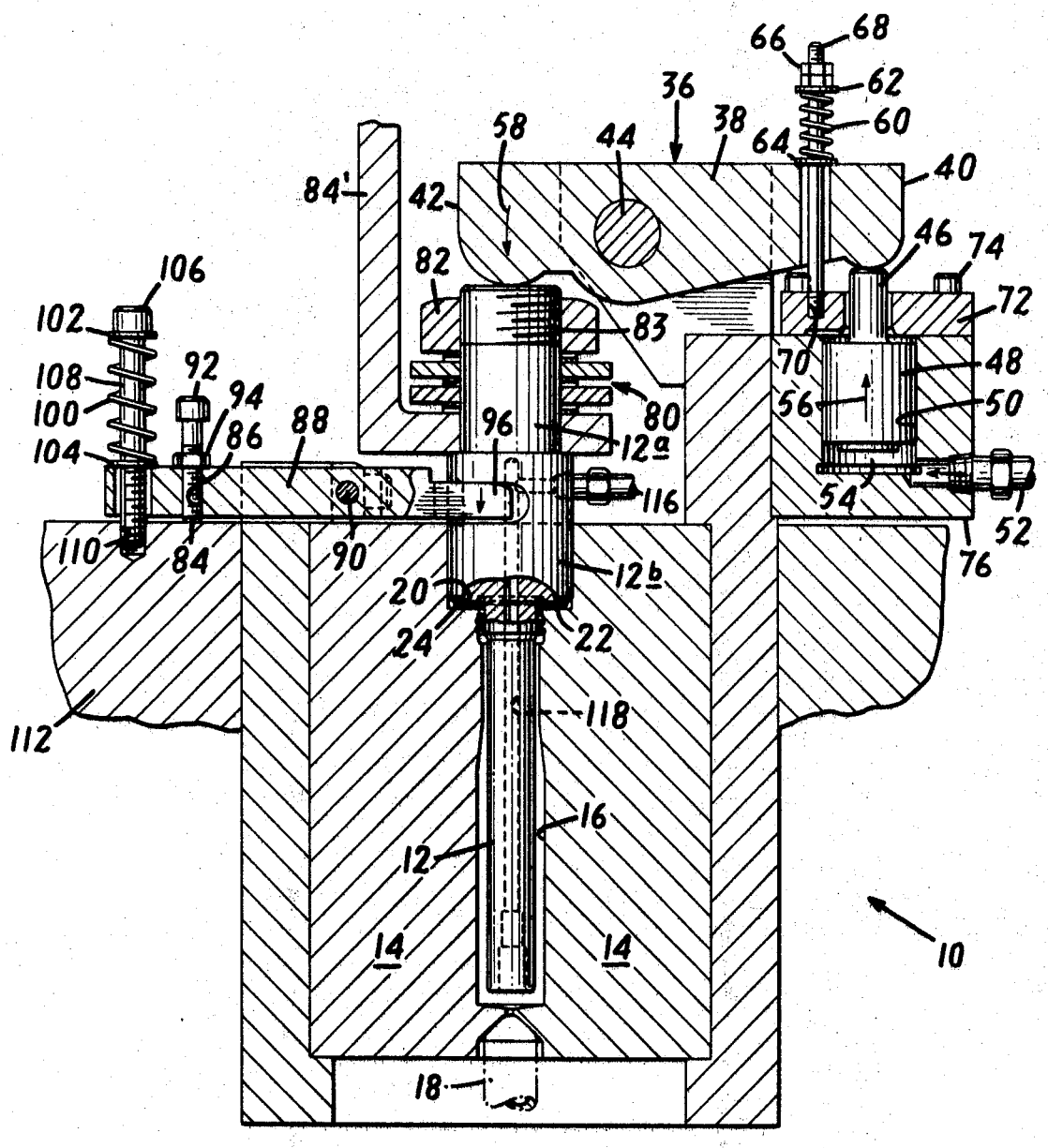
FIG. 1 is a view of apparatus constructed in accordance with the invention taken generally along the line 1—1 of FIG. 2 and looking in the direction of the arrows.
Figure 2:
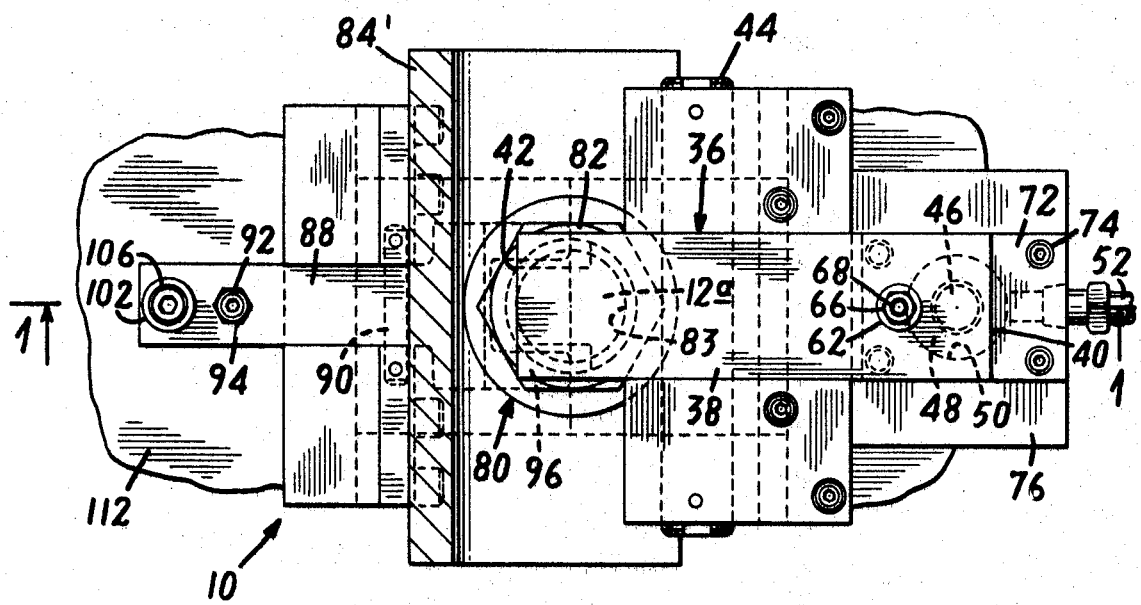
FIG. 2 is a plan view of the apparatus of FIG. 1.

FIG. 1 shows injection molding apparatus 10 constructed in accordance with the invention. The apparatus includes a core pin and one or more outer mold sections 14. The core pin 12 and outer mold sections 14 constitute inner and outer mold means defining a mold cavity 16.

Injection means 18 is provided for injecting a mold substance into the injection mold cavity 16. Such injection is effected only after lower and upper mating plane annular surfaces 20 and 22 are brought into engaging relation.

Figure 3:
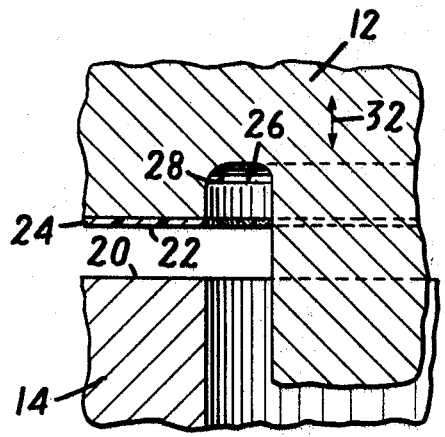
FIG. 3 is a fragmentary sectional view on a greatly enlarged scale of a portion of the apparatus visible in FIG. 1 and showing the apparatus in an open or retracted initial position.

FIG. 3 best shows the mating surfaces 20 and 22. One of the surfaces, for example the surface 22, is provided with a gasket 24 so that, when the surfaces 20 and 22 are in engaging relation, they form a tight seal adapted substantially to eliminate flashing of mold substance.

Figure 4:
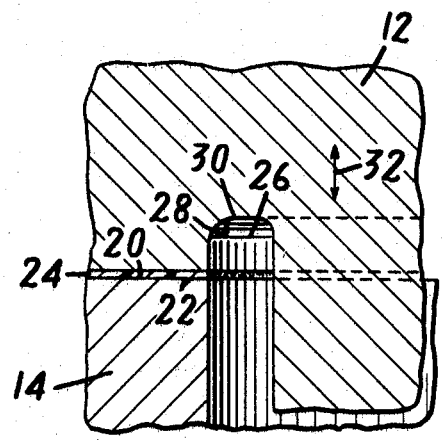
FIG. 4 is a view corresponding to FIG. 3 showing the apparatus in a closed or advanced injection position.

A recess 26 is formed at the upper end (as seen in FIGS. 1, 3, and 4) of the portion of the mold core pin 12 that assists in the definition of the mold cavity 16. The recess 26 is defined by the structure of the wall 28, which constitutes the rim-defining portion of the core pin 12.

FIG. 4 shows the apparatus in a closed, advanced, or injection condition in which the surfaces 20 and 22 are in engaging relation. These surfaces form a seal preventing flashing of mold substance, the seal being spaced apart from the extremity 30 of the rim of the manufactured article. The movement of the core pin 12 with respect to the outer mold sections 14 is in the direction indicated by the double-headed arrow 32 shown in FIGS. 3 and 4. It will be noted that the directions of movement are perpendicular to the planes of the surfaces 20 and 22.

Two very important advantages result from the structure of the invention described above. First, the formation of a seal by the surfaces 20 and 22 occurs in such a position as to make flashing at the extremity 30 impossible. Second, the surfaces 20 and 22 are not caused to slide one across the other in moving from the open position of FIG. 3 to the closed injection position of FIG. 4.

Thus, articles manufactured by the apparatus of the invention are superior both with respect to their appearance and with respect to their function to articles manufactured by conventional apparatus. Moreover, the apparatus of the invention shows virtually no wear of the surfaces 20 and 22 even after a very large number of injection cycles. In conventional apparatus, in contrast, typically having mating surfaces oriented parallel to the core pin axis, wear of the mating surfaces quickly results and flashing occurs, typically at the extremity of the rim of the molded article.

The motive means 36 for moving the surfaces 20 and 22 into engaging relation is best shown in FIG. 1. The motive means 36 includes a rocker arm 38 having opposite ends 40 and 42. The rocker arm 38 is pivotally mounted on a transverse shaft 44. The end 40 of the rocker arm 38 bears against a ram extension 46 integral with a piston 48 mounted in a cylinder 50.

Means such as a line 52 is provided for introducing a fluid such as oil or air into a chamber 54 at the lower end of the cylinder 50. The piston 48 is thus forced upwardly (as seen in FIG. 1) in the direction of the arrow 56 to pivot the rocker arm 38 counterclockwise as shown by the arrow 58. The end 42 of the rocker arm 38 thus forces the core pin 12 downwardly so that the sealing surfaces 20 and 22 are moved relatively from their positions of FIG. 3 to their positions of FIG. 4.

Rotation of the rocker arm 38 in a clockwise direction as seen in FIG. 1 is facilitated in part by a compression coil spring 60 having one end abutting a washer 62 and the other end abutting a washer 64. The washer 62 is positioned by adjustment of a nut and jamnut combination 66 screwed onto a threaded pin 68. The pin 68 is in turn screwed into a threaded aperture 70 formed in a plate 72 secured by suitable means such as bolts 74 to the cylinder block 76 defining the cylinder 50.

Adjustment of the nut and jamnut combination 66 adjusts the force exerted by the compression coil spring 60. When the pressure of the oil, air or other fluid introduced through the line 52 is sufficiently reduced, the spring 60 causes pivoting of the rocker arm 38 in a clockwise direction, in combination with additional biasing means to be described.

Additional biasing of the rocker arm 38 is effected by a relatively strong wave spring and washer combination indicated generally at 80. One end of the combination bears against an adjustment nut 82, and the other end against a supporting stationary frame member 84'. The nut 82 is screwed onto a threaded portion 83 formed on the rearmost or uppermost portion 12a of the core pin 12. The wave spring 80 is in compression and urges the nut 82 upwardly as seen in FIG. 1 and hence the rocker arm 38 clockwise.

Movement of the nut 82 upwardly under the urging of the wave spring 80 is limited by an adjustable stop pin 84 screwed into a threaded aperture 86 in a yoke 88 pivotally mounted on a transverse shaft 90. The stop pin 84 is adjustable by engagement and rotation of a head 92 formed thereon and can be locked in a desired position by tightening a nut 94 against the yoke 88.

The yoke 88 is forked at 96 and engages a rearward or upward extension 12b of the core pin 12.

The yoke 88 is biased in a counterclockwise direction about the transverse shaft 90 by a compression coil spring 100 abutting a washer 102 at its upper end and a washer 104 at its lower end. The washer 102 abuts a head 106 formed on a pin 108 screwed into threaded aperture 110 in a supporting frame member 112.

In operation, a suitable fluid is introduced into the line 52, forcing the piston 48 upwardly and the rocker arm 38 in a counterclockwise direction. The core pin 12 is forced downwardly, as shown in FIG. 1, so that the mating surfaces 20 and 22 move from their positions of FIG. 3 to their positions of FIG. 4, sealing the injection mold cavity 16. Mold substance is introduced through the nozzle 18, filling the mold cavity 16. The pressure of the fluid is reduced, and the springs 60, 80, and 100 return the core pin 12 to the position of FIG. 3. The parison formed in the injection cavity 16 is placed in a blow mold (not shown) and a suitable fluid such as air is introduced through a line 116, 118 to expand the parison to produce the desired final article.

Thus there is provided in accordance with the invention novel and highly-effective injection molding apparatus for facilitating manufacture of a plastic container having a rim defining an opening thereinto. In accordance with the invention, the relative movement is at an angle to the mating surfaces to prevent wear of the surfaces, and the surfaces mate at a location spaced apart from the extremity of the rim of the molded article. It is apparent that flashing is minimized at the mating surfaces even after a large number of injection cycles and entirely prevented at the extremity of the rim. Another advantage of the invention is that it facilitates the manufacure of containers having various lip or rim designs. Conventional apparatus typically requires that the outer edge of the lip or rim be defined by surfaces meeting at a right angle. The resulting edge is sharp and can cut the liner of a closure for the container such as a bottle cap. The edge can also cut the mouth of a user in cases where the container holds a beverage. These disadvantages are all overcome in accordance with the present invention, which facilitates the manufacture of plastic containers having a lip or rim which is rounded in cross-sections, as FIGS. 3 and 4 best illustrate.

Many modifications of the representative embodiment of the invention described above will readily occur to those skilled in the art. Accordingly, the invention is to be construed as including all of the modifications within the scope of the appended claims.

I claim:

1. Injection molding apparatus for facilitating manufacture of a plastic container having a rim defining an opening thereinto, comprising inner and outer mold means co-operating to form an injection mold cavity, said inner mold means being formed with a rim-defining portion and a first annular mating surface and said outer mold means being formed with a second annular mating surface, said surfaces being complemental and parallel to each other, motive means for effecting relative movement of said inner and outer mold means with respect to each other to bring said surfaces into engaging relation, said relative movement being at an angle to said surfaces to preclude sliding of said surfaces across each other during said relative movement, said surfaces when engaged being spaced apart from the extremity of said rim-defining portion to preclude flashing of mold substance at the extremity of said rim, and means for injecting mold substance into said cavity following said relative movement of said mating surfaces into engaging relation, said motive means including a rocker arm having opposite ends, pivot means pivotally mounting said rocker arm intermediate said ends, a cylinder mounted adjacent to one of said ends, a piston mounted in said cylinder having a ram extension adapted to bear against said one end, means for forcing a fluid into said cylinder to cause said ram extension to pivot said rocker arm about said pivot means, the other of said ends bearing against said inner mold means and forcing said surfaces into engaging relation, and biasing means mounted adjacent to said rocker arm and urging said rocker arm in a direction opposite to the direction in which said rocker arm is pivoted by said ram extension, and urging said inner mold means to move in a direction opposite to the direction in which said inner mold means moves in bringing said surfaces into engaging relation further comprising yoke means separate from said motive means and pivotally mounted adjacent to said inner mold means, said yoke means being engageable with a portion of said inner mold means for limiting movement of said inner mold means in said direction opposite to said direction in which said inner mold meas moves in bringing said surfaces into engaging relation.

2. Apparatus as set forth in claim 1 in which said rim-defining portion is rounded in cross-section.

3. Apparatus as set forth in claim 1 wherein one of said mold means includes a gasket and one of said surfaces is a surface of said gasket.

References Cited

UNITED STATES PATENTS

| | | | |
|---|---|---|---|
| 2,715,326 | 8/1955 | Gits | 215—13 |
| 3,195,186 | 7/1965 | Gauban et al. | 18—43 |
| 3,173,175 | 3/1965 | Lemelson. | |

THERON E. CONDON, Primary Examiner

H. A. KILBY, Jr., Assistant Examiner

U.S. Cl. X.R.

18—5